Oct. 2, 1951     A. P. DUNLOP ET AL     2,570,027
PROCESS FOR POLYMERIZING FURFURYL ALCOHOL
Filed July 2, 1947
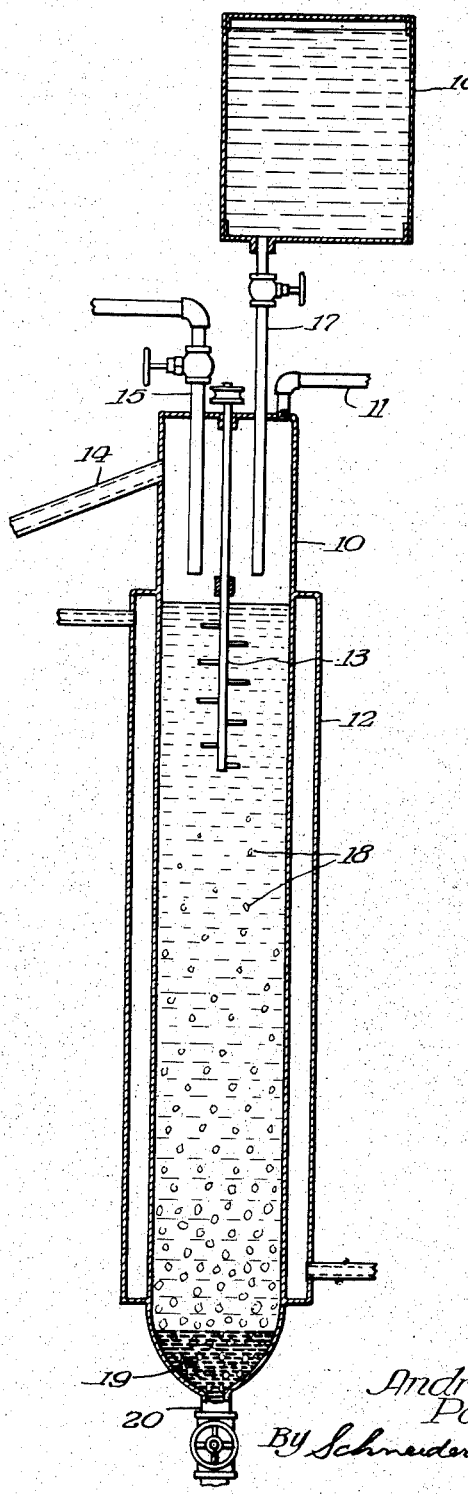
Inventors:
Andrew P. Dunlop
Paul R. Stout
By Schneider & Dressler
Attys

UNITED STATES PATENT OFFICE 2,570,027

PROCESS FOR POLYMERIZING FURFURYL ALCOHOL

Andrew P. Dunlop, Riverside, and Paul R. Stout, Chicago, Ill., assignors to The Quaker Oats Company, a corporation of New Jersey Application July 2, 1947, Serial No. 758,508

10 Claims. (Cl. 260—88.5)

This invention relates to the polymerization of furfuryl alcohol and more particularly to the partial polymerization of furfuryl alcohol in a continuous manner.

According to prior art practice, furfuryl alcohol is partially polymerized by batch methods. The partial polymerization or partial resinification of furfuryl alcohol in accordance with these methods is accomplished by heat alone or by heat in conjunction with a catalyst. The addition of a catalyst decreases the time required to bring about the desired polymerization but when a catalyst has been employed the partially polymerized furfuryl alcohol, after separation from the dilute aqueous acidic catalyst, must be washed to remove occluded catalyst, or the partially polymerized furfuryl alcohol must be treated to neutralize the catalyst to prevent undesired polymerization prior to the use of the partially polymerized furfuryl alcohol.

The catalysts which have been used to effect partial polymerization of furfuryl alcohol are inorganic acids, organic acids, carboxylic acids, sulfonic acids and acidic salts. In short, any acidic material may be used to effect the partial polymerization. Specific examples of catalysts which have been used for phosphoric acid, sulfuric acid, oxalic acid, acetic acid, mono-, di-, and trichloroacetic acids, hydrochloric acid, paratoluene sulfonic acid, ammonium chloride, calcium chloride, ferric chloride, boron trifluoride, iodine and the like.

In general, furfuryl alcohol is partially polymerized by heat alone in accordance with prior art methods by refluxing furfuryl alcohol until it forms a resin of the desired viscosity. Furfuryl alcohol is partially resinified with a catalyst in accordance with prior art methods by heating furfuryl alcohol in an open vessel in the presence of a dilute aqueous acidic catalyst until a resin of the desired viscosity is formed. The resin is then separated from the catalyst and treated to either remove or neutralize the occluded catalyst.

When heat alone is utilized to effect the partial polymerization of furfuryl alcohol the reaction takes place very slowly and usually a period of days is required to obtain the desired degree of polymerization. When a catalyst is used care must be exercised to modulate the reaction because the reaction is exothermic and it may proceed with explosive violence. Care must also be exercised in preventing the reaction from proceeding too far. As is known, resinification of furfuryl alcohol may be carried on until it is converted to an infusible mass.

Large and costly equipment is necessary to effect proper control of the reaction involving the partial resinification of furfuryl alcohol in the presence of an acidic catalyst.

In accordance with the present invention we partially polymerize furfuryl alcohol in the presence of an acidic catalyst continuously, preferably a dilute aqueous acidic catalyst, utilizing rather simple and inexpensive equipment. By the method of our invention the speed of the reaction can be controlled readily throughout the entire process and it is not usually necessary to wash the catalyst from the separated resin or to neutralize the resin therein, since the catalyst is extracted from the partially polymerized furfuryl alcohol in the reaction chamber.

In the embodiment illustrated herein, the reaction vessel used in carrying out the method of the present invention is in the form of an elongated tube, suitably cylindrical. The vessel may be open to the atmosphere or it may be a closed vessel, as desired. Within the reaction vessel there is maintained an elongated liquid body of catalyst in which furfuryl alcohol is soluble, preferably a dilute aqueous acidic catalyst.

The method of the present invention generally comprises the steps of continuously introducing furfuryl alcohol to the elongated body of an aqueous acidic catalyst, at or adjacent the top thereof, which is maintained at a polymerizing temperature not above its boiling point; maintaining the furfuryl alcohol in contact with the catalyst until a partially polymerized globule of furfuryl alcohol separates out from the solution thereof in the acidic catalyst; permitting the globule of partially polymerized furfuryl alcohol to settle through a substantial portion of the elongated body of acidic catalyst and settle and agglomerate into a pool at the bottom of the reaction chamber; and continuously removing the partially polymerized liquid furfuryl alcohol from the pool in the reaction chamber.

The factors which affect the reaction involved in the method of the present invention are (1) the length of the elongated body of aqeous acidic catalyst, (2) the cross-sectional area of this elongated body, (3) the temperature thereof, (4) the character and concentration of the acidic material therein, and (5) the rate of addition of the furfuryl alcohol to the catalyst. In general, other things being equal, the higher the temperature, the faster the reaction; likewise, the stronger the acid, the faster the reaction.

The length of the elongated body of aqueous acidic catalyst used in accordance with the present invention may vary widely; however, it should be long enough, with the proper catalyst and temperature thereof, (a) to permit a contact or residence time of the furfuryl alcohol in the catalyst sufficient to form a partially polymerized globule of furfuryl alcohol which then separates out from the solution and (b) to permit the separated globule to descend through the body of liquid acidic material so that any catalyst occluded in the globule can be washed therefrom.

The longer the elongated liquid catalyst body the less is the amount of unreacted furfuryl alcohol in the final product. A longer liquid body of catalyst allows a larger zone of dissolved furfuryl alcohol at the top thereof and further allows an increased throughput of furfuryl alcohol for the same viscosity of product. Moreover, a longer elongated liquid body decreases the mechanical mixing of the freshly added furfuryl alcohol with the completed polymer.

As is apparent, the contact time of the furfuryl alcohol with the catalyst may be varied widely. We have obtained satisfactory products with contact times varying from about 18 to 145 minutes. This is not to be understood as indicating the range of contact times which may be used in practicing our invention, for longer and shorter contact times may be used, if desired.

The cross-sectional area of the elongated body may also vary widely. An increase in this cross-sectional area directly affects the throughput of the furfuryl alcohol and inversely affects the heat transfer between the solution of the furfuryl alcohol in the liquid body of acidic catalyst and the heated wall of the reaction chamber.

As pointed out above an increase in temperature increases the rate of reaction. Thereby it increases the maximum throughput for a given product. If the throughput is held constant an increase in the temperature increases the degree of condensation and the rate of insolubilization, in the same manner as an increase in the length of the elongated liquid body of catalyst. In general, any elevated reaction temperature up to, and including, the boiling point of the liquid catalyst may be used. For substantially all purposes a reaction temperature in the order of from about 50°–110° C. is suitable, where the reaction is conducted at atmospheric pressure. The reaction may be carried out under a vacuum or at elevated pressure. The maximum operating temperature is dependent upon the pressure used.

During the resinification of the furfuryl alcohol some water of condensation is formed and this commingles with the liquid body of catalyst, thereby diluting it. It is preferred, therefore, in the operation of the process of the present invention that the reaction temperature be maintained so that water is driven off from the liquid body of catalyst and the amount of that water so driven off balances the water of condensation which tends to dilute the catalyst.

An increase in the catalyst concentration affects the reaction rate and otherwise affects the reaction in the same manner as an increase in temperature. In the case of a catalyst such as phosphoric acid, for example, the catalyst concentration may vary from about 0.1 N up to as high as 10 N and even more. For most purposes a concentration of this acid of from 0.11 N to 4.7 N is sufficient. In the case of catalysts such as hydrochloric acid and sulfuric acid, for example, the catalyst concentration may vary from about 0.05 N to 5.0 N. In the case of acidic salts such as ammonium, calcium and ferric chlorides, for example, the concentration may vary from about 0.2 N up to approximately the saturation point of the salts in water at room temperature.

An increase in the furfuryl alcohol input increases the concentration of dissolved furfuryl alcohol in the liquid catalyst. Accordingly, the partially polymerized globules will extract more furfuryl alcohol from solution and the end product will contain a higher percentage of unreacted furfuryl alcohol. In general, the input of furfuryl alcohol should be controlled to permit partial polymerization to the desired degree of substantially all of the furfuryl alcohol in approximately the upper half portion of the body of liquid catalyst, thereby permitting the washing operation to take place in the lower half portion.

The catalyst which may be used in accordance with the present invention may be any one or more of those named above, as well as others. In general any water-soluble acidic material can be used in accordance with the present invention. The amount thereof depends on the strength of the acidic material as an acid. Acids which are volatile in the presence of water are undesirable, since they would require replenishment. Oxidizing catalysts such as nitric acid are not desirable because they form side reaction products and thereby reduce the amount of desired product. Also, these catalysts are used up in the reaction and must be replenished. However, they may be used, if desired. The preferred catalysts are inorganic acids which are substantially non-volatile at the reaction temperatures and which are substantially insoluble in the partially polymerized furfuryl alcohol. It is to be noted that some neutralization of the final product may be required even where the catalysts used are insoluble in the polymer because some of this catalyst may be carried into the product with the water which it may occlude.

The accompanying drawing illustrates diagrammatically apparatus suitable for carrying out the invention continuously.

The reaction chamber 10 is in the form of an elongated cylindrical tube which initially is filled with dilute aqueous acidic catalyst through inlet 11, until the body of liquid catalyst occupies approximately three-fourths of the total length of the tube. A jacket 12 through whch a heat transfer medium may be circulated surrounds the tube. Steam, hot liquid or other heat transfer media may be circulated through jacket 12 to heat the liquid body of catalyst up to a polymerizing temperature and maintain the desired temperature during operation by adding or removing heat as required. Since relatively more heat of reaction is liberated in the upper region of the tube, the heat transfer medium may be made to function simultaneously as cooling agent at the top of the jacket and heating agent at the lower part of the jacket by introducing the heat transfer medium at the top of the jacket and removing it at the bottom.

An agitator 13, driven in any suitable manner, may project into the upper portion of the liquid body of catalyst and serve to effect better heat transfer between the solution of the furfuryl alcohol in the liquid catalyst and the heated wall of tube 10, particularly when reaction tubes of large diameter are used. A vent 14 is provided at the upper portion of tube 10 to permit vapors evolved from the liquid body of catalyst to pass from the reaction chamber. A valve-controlled air supply pipe 15 may also be provided at the top of the reaction chamber. Air or other suitable gas may be introduced through this pipe to assist in the formation of water vapor from the liquid body and in the removal thereof from the reaction chamber through the vent.

The furfuryl alcohol to be partially resinified is maintained in a suitable tank 16 positioned preferably above the reaction chamber so that the furfuryl alcohol may run by gravity from the tank into the body of liquid catalyst, through a valved pipe 17. As is evident, this valved pipe, as well as valved air pipe 15, extends through the top closed wall of the reaction chamber.

As the furfuryl alcohol in solution in the catalyst polymerizes globules of the polymerized furfuryl alcohol form and separate from the solution. These globules of partially polymerized furfuryl alcohol are indicated, by the numeral 18, in a general way. As the separated globules descend through the body of liquid catalyst any catalyst which may be occluded in the globules is washed therefrom. The globules agglomerate and accumulate at the bottom of the reaction chamber in the form of a pool 19 from which they are removed through the valved drain pipe 20 at the bottom of the reaction chamber.

In the normal operation of the invention the valve in the drain pipe 20 is maintained closed until a pool of partially polymerized furfuryl alcohol builds up. The valve in this pipe is then opened to such an extent as to permit the withdrawal of partially polymerized furfuryl alcohol at about the same rate that the globules of partially polymerized furfuryl alcohol are added to the pool.

The invention will be fully understood from the following detailed illustrative embodiments which were carried out by applicants.

*Example 1*

A tube about 64 inches in height, measured from the valve at the bottom thereof, was filled with 1350 ml. of a catalyst solution, made up from solutions formed by dissolving 12 ml. of 85% $H_3PO_4$ in 100 ml. of water. This quantity of catalyst occupied about 45 inches of the length of the tube, measured from the drain valve at the bottom. The tube was open to the atmosphere.

The elongated body of liquid catalyst in the tube was initially brought up to 90° C. and heat was applied to the tube during the first half hour of operation to maintain the catalyst at that temperature. Technical furfuryl alcohol was fed into the top of the body of liquid catalyst at the rate of about 35 ml. per minute. After 2½ hours a total of 4 liters of furfuryl alcohol had been added and during that time the reaction temperature varied from about 90 to 107° C.

The product removed from the reaction vessel consisted of 2900 ml. of viscous, partially polymerized furfuryl alcohol having a density of about 1.2. The contact time of the furfuryl alcohol with the catalyst was approximately 45 minutes.

*Example 2*

A reaction tube similar to the reaction tube in Example 1 was used. In this example, however, only 150 ml. of the catalyst solution of Example 1 was used. This quantity of catalyst solution occupied approximately 18 inches of the tube, measured from the drain valve at the bottom. The temperature of the catalyst within the tube was maintained at approximately 77–85° C. throughout the reaction.

Technical furfuryl alcohol was passed into the heated catalyst at the rate of about 100 ml. per hour. After 110 minutes 160 ml. had been added. During this time 100 ml. of viscous, partially polymerized furfuryl alcohol resin was removed from the tube. The viscosity of this resin was approximately 400 centipoises, measured on a Brookfield viscosimeter. The contact time of the furfuryl alcohol with the catalyst was approximately 90 minutes.

*Example 3*

The catalyst solution remaining at the completion of Example 2 was heated to 91–101° C., and technical furfuryl alcohol was passed into the catalyst at the same rate as in Example 2. After 84 minutes 138 ml. of furfuryl alcohol had been added. Approximately 100 ml. of a very viscous, partially polymerized furfuryl alcohol resin was removed from the reaction chamber. The viscosity of this resin was approximately 80,000 centipoises, as measured on a Brookfield viscosimeter. The contact time of the furfuryl alcohol with the catalyst was approximately 90 minutes.

*Example 4*

The catalyst solution remaining after Example 3 was maintained at 93–99° C., and furfuryl alcohol was passed into the catalyst at an increased rate. After 31 minutes, a total of 128 ml. of partially polymerized furfuryl alcohol had been added. 100 ml. of viscous resin was removed from the reaction tube. This resin had a viscosity of about 10,000 centipoises, as measured on a Brookfield viscosimeter. The contact time of the furfuryl alcohol with the catalyst was approximately 45 minutes.

It is to be understood that the invention is not to be construed as limited to the details of the illustrative embodiments herein above described.

In the specification and claims, the word "elongated" in the expression "elongated body" of catalyst has reference to the length of travel of the furfuryl alcohol in its unpolymerized and polymerized states through the catalyst body, irrespective of the relative transverse dimension thereof.

We claim:

1. The continuous process of making partially polymerized furfuryl alcohol which comprises continuously introducing furfuryl alcohol at the top of an elongated body of a dilute aqueous acidic catalyst which is maintained at an elevated temperature up to its boiling point, maintaining the furfuryl alcohol in contact with said catalyst until polymerization thereof is effected and globules of partially polymerized furfuryl alcohol are formed which separate from the catalyst solution and settle to the bottom thereof and agglomerate into a pool, and continuously removing partially polymerized furfuryl alcohol from the said pool.

2. The continuous process of making partially polymerized furfuryl alcohol which comprises continuously introducing furfuryl alcohol at the top of an elongated body of an aqueous acidic catalyst which is maintained at an elevated temperature up to its boiling point, maintaining the furfuryl alcohol in contact with said catalyst until polymerization thereof is effected and globules of partially polymerized furfuryl alcohol are formed which separate from the catalyst solution 3. The continuous process of making partially polymerized furfuryl alcohol which comprises continuously introducing furfuryl alcohol at the top of an elongated body of an aqueous acidic catalyst which is maintained at a polymerizing temperature but below its boiling point, maintaining the furfuryl alcohol in contact with said catalyst until polymerization thereof is effected and globules of partially polymerized furfuryl alcohol are formed which separate from the catalyst solution and settle to the bottom thereof and agglomerate into a pool, continuously removing water from the catalyst body during the polymerization at about the rate water of condensation is formed, and continuously removing partially polymerized furfuryl alcohol from the said pool.

4. The continuous process of making partially polymerized furfuryl alcohol which comprises continuously introducing furfuryl alcohol at the top of an elongated body of a dilute aqueous mineral acid catalyst which is maintained at a polymerizing temperature but below its boiling point, maintaining the furfuryl alcohol in contact with said catalyst until polymerization thereof is effected and globules of partially polymerized furfuryl alcohol are formed which separate from the catalyst solution and settle to the bottom thereof and agglomerate into a pool, and continuously removing partially polymerized furfuryl alcohol from the said pool.

5. The continuous process of making partially polymerized furfuryl alcohol which comprises continuously introducing furfuryl alcohol at the top of an elongated body of a dilute aqueous phosphoric acid solution which is maintained at a polymerizing temperature but below its boiling point, maintaining the furfuryl alcohol in contact with said acid solution until polymerization thereof is effected and globules of partially polymerized furfuryl alcohol are formed which separate from the solution and settle to the bottom of the elongated body of acid solution and agglomerate into a pool, and continuously removing partially polymerized furfuryl alcohol from the said pool.

6. The continuous process of making partially polymerized furfuryl alcohol which comprises continuously introducing furfuryl alcohol at the top of an elongated body of an aqueous acidic catalyst which is maintained at a polymerizing temperature but below its boiling point, maintaining the furfuryl alcohol in contact with said catalyst until polymerization thereof is effected and globules of partially polymerized furfuryl alcohol are formed which separate from the catalyst solution and then descend through at least a substantial portion of the solution to the bottom thereof and agglomerate into a pool, continuously removing water from the catalyst body during the polymerization at about the rate water of condensation is formed, and continuously removing partially polymerized furfuryl alcohol from the said pool.

7. The continuous process of making partially polymerized furfuryl alcohol which comprises continuously introducing furfuryl alcohol at the top of an elongated body of a dilute aqueous acid catalyst which is maintained at a polymerizing temperature but below its boiling point, maintaining the furfuryl alcohol in contact with said catalyst until polymerization thereof is effected and globules of partially polymerized furfuryl alcohol are formed which separate from the catalyst solution and then descend through at least a substantial portion of the solution to the bottom thereof and agglomerate into a pool, and continuously removing partially polymerized furfuryl alcohol from the said pool.

8. The continuous process of making partially polymerized furfuryl alcohol which comprises continuously introducing furfuryl alcohol at the top of an elongated body of a dilute aqueous mineral acid catalyst which is maintained at a polymerizing temperature but below its boiling point, maintaining the furfuryl alcohol in contact with said catalyst until polymerization thereof is effected and globules of partially polymerized furfuryl alcohol are formed which separate from the catalyst solution and then descend through at least a substantial portion of the solution to the bottom thereof and agglomerate into a pool, and continuously removing partially polymerized furfuryl alcohol from the said pool.

9. The continuous process of making partially polymerized furfuryl alcohol which comprises continuously introducing furfuryl alcohol at the top of a body of a dilute aqueous acidic catalyst in which furfuryl alcohol is soluble and which is maintained at an elevated temperature up to its boiling point, maintaining the furfuryl alcohol in contact with said catalyst until polymerization thereof is effected and globules of partially polymerized furfuryl alcohol are formed which separate from the catalyst solution and settle to the bottom thereof and agglomerate into a pool, and continuously removing partially polymerized furfuryl alcohol from the said pool.

10. The continuous process of making partially polymerized furfuryl alcohol which comprises continuously introducing furfuryl alcohol at the top of a body of an aqueous acidic catalyst which is maintained at a polymerizing temperature but below its boiling point, maintaining the furfuryl alcohol in contact with said catalyst until polymerization thereof is effected and globules of partially polymerized furfuryl alcohol are formed which separate from the catalyst solution and settle to the bottom thereof and agglomerate into a pool, and continuously removing partially polymerized furfuryl alcohol from the said pool.

ANDREW P. DUNLOP.
PAUL R. STOUT.

REFERENCES CITED

The following references are of record in the file of this patent:

UNITED STATES PATENTS

| Number | Name | Date |
|---|---|---|
| 2,075,429 | Douglas | Mar. 30, 1937 |
| 2,323,333 | Kauth | July 6, 1943 |
| 2,323,334 | Kauth | July 6, 1943 |
| 2,363,951 | Fikentscher | Nov. 28, 1944 |

OTHER REFERENCES

Dunlop and Peters: Ind. and Eng. Chem., July 1942, pages 814–817.